No. 746,071. PATENTED DEC. 8, 1903.
J. W. GRAY.
WHEEL FOR VEHICLES.
APPLICATION FILED JAN. 28, 1903.
NO MODEL.

Witnesses
B. Patterson
S. M. Stone

By his Attorneys

Inventor
J. W. Gray

No. 746,071. Patented December 8, 1903.

UNITED STATES PATENT OFFICE.

JOHN WILBERT GRAY, OF SUMMIT, NEW JERSEY.

WHEEL FOR VEHICLES.

SPECIFICATION forming part of Letters Patent No. 746,071, dated December 8, 1903.

Application filed January 28, 1903. Serial No. 140,842. (No model.)

*To all whom it may concern:*

Be it known that I, JOHN WILBERT GRAY, a citizen of the United States, and a resident of Summit, county of Union, and State of New Jersey, have invented certain new and useful Improvements in Wheels for Wheeled Vehicles, of which the following is a specification, reference being had to the accompanying drawings, forming a part thereof, in which similar letters of reference indicate corresponding parts.

This invention relates to improvements in wheels for wheeled vehicles.

It has long been recognized as a fact that if the wheels of a vehicle be rigid the motion of that vehicle as it passes over minor obstructions will produce frequent and disagreeable jolting. This has been partly obviated by the use of springs interposed between the bed and the running-gears of a vehicle of this kind. The difficulty was not entirely thereby obviated. It is to eliminate so much of that jolting as has not been obviated by such springs that my present invention has been devised.

The object of the invention is also to produce such a resilient wheel as will obviate all jolting.

The object of the invention is also to produce a wheel applicable to a large proportion of wheeled vehicles which by novel arrangement of springs and other parts within itself is rendered resilient.

The invention also has divers other objects which will be hereinafter fully set forth.

The nature of the invention consists of the combination in a wheel of duplicate fellies and duplicate spokes, with springs arranged in novel combination, whereby the said wheel is rendered resilient.

The invention also consists in the combination in a wheel of two fellies, one within the other, and radial spokes secured in said fellies, of springs arranged in novel combination with and acting on said fellies and rendering said wheel resilient.

The nature of the invention also consists in the combination in a wheel of two fellies, one within the other, and radial spokes engaging said fellies, with springs embracing a plurality of said spokes engaging said fellies and rendering said wheel resilient.

The invention also consists in divers other novel features which will be fully understood from the following general description and the annexed drawings and will be subsequently pointed out in the claims.

Figure 1:
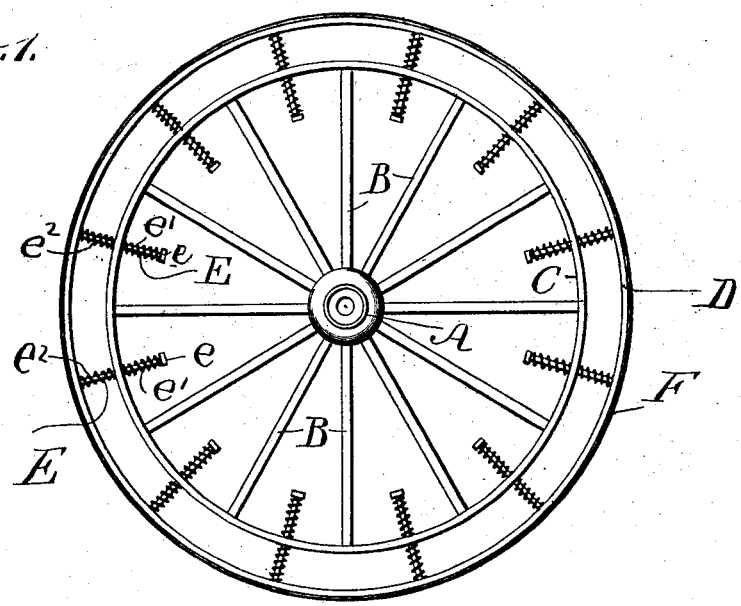
Figure 2:
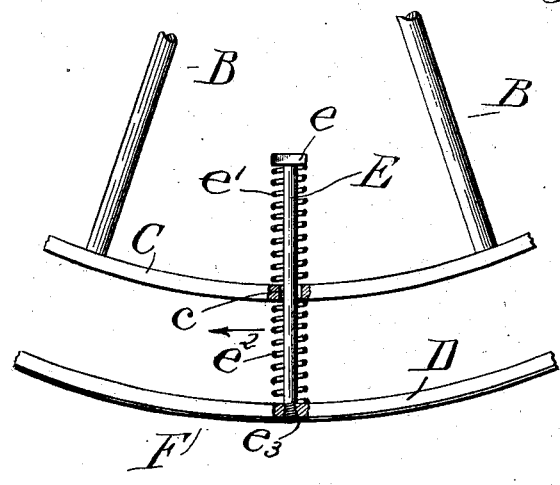

In the annexed drawings, which are hereby made a part of this specification, Figure 1 is a side view in elevation of a wheel embodying my invention. Fig. 2 is a detail view of a part of the same, partly broken away, the better to illustrate my invention.

In Fig. 1, A designates the hub of the wheel, which, as illustrated, is of common and well-known form, pierced with a central bearing to accommodate the axle on which it revolves, B the spokes, and C the felly, of the interior wheel.

D designates the exterior felly. In this are fixed the spokes E. These may be fastened by means of a screw-thread cut on the outer end or in any other convenient and available way in the openings $e^3$.

In the interior fellies C there is a plurality of openings $c$, through which the spokes E pass, loosely fitted therein. On the inner end of each spoke E is a head $e$.

$e'$ designates spiral springs which are interposed between the heads $e$ and the fellies C and embrace the spoke E.

$e^2$ also designates spiral springs which, embracing the spokes E, are interposed between the fellies C and D. These two springs are so arranged that they are sufficiently compressed to normally hold the two fellies in concentric position, as illustrated in the drawings.

This wheel may be made of any applicable and available material and is to be used on bicycles, wagons, buggies, carriages, hacks, and similar wheeled vehicles in the common and well-known way. It will be found, however, in practice that while the wheel revolves on its axle on account of the resilience of the springs $e'$ and $e^2$ allowing the spokes E to slip a little in the openings $c$ of the felly C the wheels will be highly resilient and when supporting a loaded vehicle will by their elasticity prevent any appreciable amount of jolting. It will be further observed that by this means solid steel tires, as F, are presented to the surface over which the vehicle rolls. This tire, being less liable to abrasion than softer substances, will greatly prolong the usefulness of the wheel and reduce the expense of repairs to a minimum.

Having now described what my invention is and how the same is constructed and used, what I claim as my invention, and desire to secure by Letters Patent, is—

1. In a wheel, for wheeled vehicles, the combination with a hub pierced with a bearing to accommodate the axle on which it turns, two rigid concentric fellies, having transverse openings, a series of longer spokes extending from the hub of said wheel to the inner felly thereof and fixed in a part of the openings in said inner felly, and a series of shorter spokes fixed in the openings of the outer felly of said wheel, extending through a part of the openings in said inner felly, between said longer spokes, and movable for a short distance endwise in said openings, of springs embracing said shorter spokes, on both sides of said inner felly and engaging both of said fellies and rendering said wheel resilient.

2. In a wheel, for wheeled vehicles, the combination with a hub pierced with a bearing to accommodate the axle on which it turns, two rigid concentric fellies having transverse openings, a series of longer spokes extending from the hub of said wheel to the inner felly thereof and fastened in a part of the openings, in said inner felly, and a series of shorter spokes fastened by one end in the said outer felly, extending inwardly and passing through a part of the openings in said inner felly between said longer spokes, and movable for a short distance endwise in such openings, and heads upon the inner ends of said shorter spokes, of springs embracing said shorter spokes, on both sides of said inner felly and engaging both of said fellies, holding them normally in concentric position and rendering said wheel resilient.

3. In a wheel, for wheeled vehicles, the combination with a hub pierced with a bearing to accommodate the axle in which it turns, two rigid concentric fellies having transverse openings, a series of longer spokes extending from the hub of said wheel to the inner felly thereof and fixed in a part of the openings therein, a series of shorter spokes fastened by one end in the openings in the outer rigid felly of said wheel, passing through a part of the openings in said inner felly between said longer spokes and movable for a short distance endwise in the opening in said inner felly, and heads upon the inner ends of said shorter spokes within said inner felly, of two series of springs embracing said shorter spokes, one series interposed between said two rigid concentric fellies and engaging both, the other series of springs interposed between the said rigid inner felly and the heads upon said shorter spokes, and having their tensions so adjusted as to normally hold said felly in concentric position, and render said wheel resilient, substantially as described.

In testimony that I claim the foregoing as my invention I have signed my name, in presence of two witnesses, this 13th day of January, 1903.

JOHN WILBERT GRAY.

Witnesses:
 THOMAS FAGAN,
 FRED E. SAYRE.